(No Model.)

C. H. BRAITHWAITE.
LAWN MOWER.

No. 504,411. Patented Sept. 5, 1893.

WITNESSES:
James H. Bell
N. E. Paige

INVENTOR:
Charles H. Braithwaite
by his atty.
Henry N. Paul Jr.

UNITED STATES PATENT OFFICE.

CHARLES H. BRAITHWAITE, OF ARDMORE, PENNSYLVANIA.

LAWN-MOWER.

SPECIFICATION forming part of Letters Patent No. 504,411, dated September 5, 1893.

Application filed January 6, 1892. Serial No. 417,134. (No model.)

*To all whom it may concern:*

Be it known that I, CHARLES H. BRAITHWAITE, of Ardmore, in the county of Montgomery and State of Pennsylvania, have invented a certain new and useful Improvement in Lawn-Mowers, of which the following is a specification, reference being had to the accompanying drawings.

My improvement consists in a lawn mower having two grass receptacles, for receiving the cut grass, the forward and smaller of which overturns its contents into the other.

Figure 1:
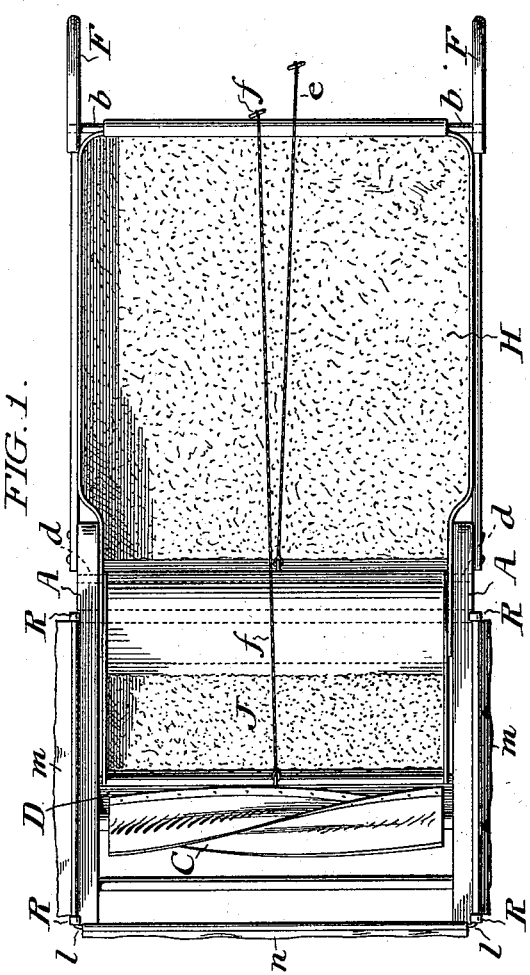
Figure 2:
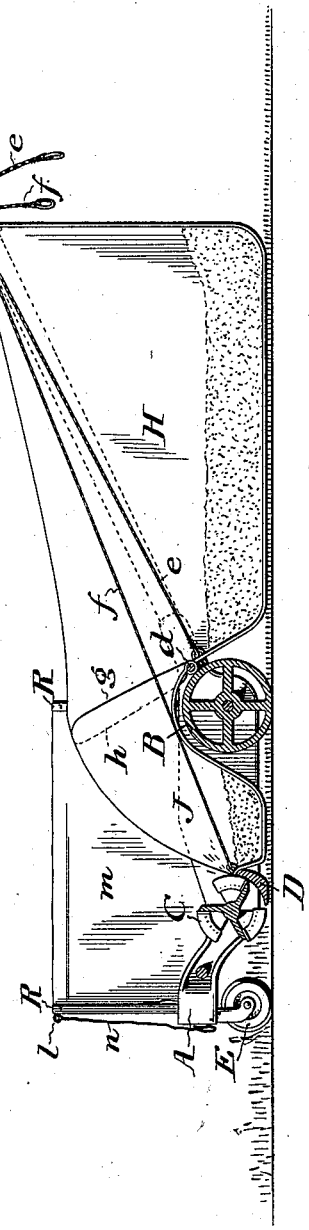

In the accompanying drawings Figure 1 is a plan view of my machine, and Fig. 2 is a central longitudinal section.

A, A, are the side frames of the machine.

B is the large roller and C the revolving cutting blades.

D is the ledger blade against which the cutting blades act.

E is one of the forward wheels. The mechanism by which the blades are driven from the large roller is not shown.

Between the handle-bars F, F, is hung the large grass receptacle H, which is swung upon the cross-bar $b$, between the handles. The general shape of the receptacle is indicated in the drawings. Its forward edge rests upon the supporting cross-bar $d$, immediately behind and a little above the large roller, and from this forward edge a cord $e$ leads to near the handle-bars, by pulling which the receptacle may be tilted up and its contents dumped out. In front of this large receptacle is the small receptacle J, which is swung upon the same cross-bar $d$, which serves for a rest for the forward edge of the large receptacle. The bottom of this receptacle is sufficiently curved upward to clear the edge of the large roller, but immediately dips down again. Its forward edge rests upon the upper surface of the ledger blade. From this forward edge a cord $f$ leads to near the handle-bars, by pulling which the small receptacle may be tilted up and its contents dumped into the larger one. Both of these receptacles have sides as high as they may conveniently be made. Where the edges of the sides of the two meet they overlap, as seen at $g$, $h$, Fig. 2, the wall of the forward receptacle sliding within that of the larger receptacle.

At the four corners of the machine proper are erected four uprights R, R, R, R, supporting a rail $l$, passing around the front and the two sides of the machine. From this rail are hung curtains, one at each side, $m$, $m$, passing down and attached to the side frame, and one in front, $n$, having its lower edge weighted and hanging down nearly but not quite to the ground.

The operation of the machine is as follows: As the cutting blades revolve they fan the cuttings over the ledger blade into the small receptacle. The curtains prevent their being blown away by the wind. When the forward receptacle is filled the operator, by pulling the cord $f$, readily overturns the contents into the larger rear receptacle, an operation which may be performed without stopping the machine. When this latter receptacle also becomes filled it is overturned and emptied by pulling the cord $e$.

Having thus described my invention, I claim—

1. In a lawn mower the combination of the revolving cutting blades, C, the large grass receptacle H, and the small grass receptacle J, situated between the cutting blades and the large grass receptacle and swung so as to be capable of being overturned irrespective of the cutting blades and depositing its contents into the large receptacle, substantially as described.

2. In a lawn mower the combination of the revolving cutting blades, C, the large grass receptacle H, the small grass receptacle J, situated between the cutting blades and the large grass receptacle and swung so as to be capable of being overturned irrespective of the cutting blades and depositing its contents into the large receptacle, and the curtains $m$, $m$, $n$, surrounding the sides and front of the machine, substantially as described.

CHARLES H. BRAITHWAITE.

Witnesses:
JAMES H. BELL,
A. E. PAIGE.